(12) United States Patent
Sebire

(10) Patent No.: US 11,259,077 B2
(45) Date of Patent: Feb. 22, 2022

(54) METHOD FOR FOLLOWING AN AUDIO-VISUAL TRANSMISSION AND EQUIPMENT ENABLING THE IMPLEMENTATION THEREOF

(71) Applicant: SAGEMCOM BROADBAND SAS, Rueil Malmaison (FR)

(72) Inventor: Julien Sebire, Rueil Malmaison (FR)

(73) Assignee: SAGEMCOM BROADBAND SAS, Rueil Malmaison (FR)

(*) Notice: Subject to any disclaimer, the term of this patent is extended or adjusted under 35 U.S.C. 154(b) by 35 days.

(21) Appl. No.: 16/694,613

(22) Filed: Nov. 25, 2019

(65) Prior Publication Data

US 2020/0177952 A1 Jun. 4, 2020

(30) Foreign Application Priority Data

Nov. 30, 2018 (FR) ...................... 1872165

(51) Int. Cl.
| | |
|---|---|
| *H04N 21/436* | (2011.01) |
| *H04N 21/233* | (2011.01) |
| *H04N 21/234* | (2011.01) |
| *H04N 21/236* | (2011.01) |
| *H04N 21/4363* | (2011.01) |
| *H04N 21/442* | (2011.01) |
| *H04N 21/422* | (2011.01) |

(52) U.S. Cl.
CPC ..... *H04N 21/43615* (2013.01); *H04N 21/233* (2013.01); *H04N 21/234* (2013.01); *H04N 21/236* (2013.01); *H04N 21/43637* (2013.01); *H04N 21/44209* (2013.01)

(58) Field of Classification Search
CPC .......... H04N 21/43615; H04N 21/233; H04N 21/234; H04N 21/236; H04N 21/43637; H04N 21/44209; H04N 21/2143; H04N 21/436

See application file for complete search history.

(56) References Cited

U.S. PATENT DOCUMENTS

| | | | |
|---|---|---|---|
| 2009/0216351 A1 | 8/2009 | Van Horck et al. | |
| 2011/0072452 A1* | 3/2011 | Shimy ................ | H04N 21/4532 725/25 |
| 2014/0330951 A1 | 11/2014 | Sukoff et al. | |

(Continued)

FOREIGN PATENT DOCUMENTS

| | | |
|---|---|---|
| EP | 3 018 845 A1 | 5/2016 |
| WO | WO 2016/180914 A1 | 11/2016 |

OTHER PUBLICATIONS

Search Report as issued in French Patent Application No. 1872165, dated Jul. 8, 2019.

(Continued)

*Primary Examiner* — Alexander Gee

(74) *Attorney, Agent, or Firm* — Pillsbury Winthrop Shaw Pittman LLP

(57) ABSTRACT

A method for following an audio-visual transmission between at least a first and a second items of broadcasting equipment connected through a router and each able to broadcast at least partially the audio-visual transmission, each of the items of broadcasting equipment including a calculation processor, a memory and an interface for following a connected device associated with a user.

12 Claims, 3 Drawing Sheets

(56) References Cited

U.S. PATENT DOCUMENTS

| | | | | |
|---|---|---|---|---|
| 2015/0181384 A1* | 6/2015 | Mayor | ................. | H04W 24/02 |
| | | | | 455/456.1 |
| 2015/0215382 A1 | 7/2015 | Arora et al. | | |
| 2016/0077710 A1* | 3/2016 | Lewis | .................... | G06F 3/011 |
| | | | | 715/716 |
| 2017/0150325 A1* | 5/2017 | Mills | ................. | G06Q 30/0267 |
| 2018/0020253 A1* | 1/2018 | Moller | ................. | H04L 65/403 |
| 2018/0247481 A1* | 8/2018 | Gilbertson | ............ | G06Q 20/18 |

OTHER PUBLICATIONS

Search Report as issued in European Patent Application No. 19211240.7, dated Dec. 19, 2019.

* cited by examiner

METHOD FOR FOLLOWING AN AUDIO-VISUAL TRANSMISSION AND EQUIPMENT ENABLING THE IMPLEMENTATION THEREOF

CROSS-REFERENCE TO RELATED APPLICATIONS

This application claims priority to French Patent Application No. 1872165, filed Nov. 30, 2018, the entire content of which is incorporated herein by reference in its entirety.

FIELD

The present invention relates to a method for following an audio-visual transmission on different items of broadcasting equipment of a premises. The invention also relates to the broadcasting equipment and the system of items of broadcasting equipment making it possible to implement this method.

The invention finds applications in the field of television reception and, in particular, in the field of the reception of televised programmes on several apparatuses.

BACKGROUND

It is known, in the field of audio-visual broadcasting, that televisions are more and more present in the interiors of private individuals and even professionals. Most homes comprise several televisions spread out in the different rooms of the home. For example, in an apartment with several rooms, it is frequent that a first television is installed in the living room, a second television in a bedroom and that a third or even a fourth television is installed in another bedroom or even the kitchen. Each television is associated with a decoder which ensures the decryption and/or the decompression of the televised programme broadcast by the distributor of audio-visual programmes—or TV operator—and the display of the decrypted/decompressed televised programme on the associated television.

The decoders are independent of each other such that each television can display a televised programme different from the televised programmes displayed on the other televisions. However, a consequence of the independence of the decoders of a same home is that a user who moves from a first room to a second room of the home, for example from the living room to the bedroom, has to, in each of the rooms, switch on the decoder if it is not already in operation, then search for the desired televised programme and programme his viewing choices (for example, the sound level, the language, etc.).

At present, a known method for following a televised programme—or audio-visual transmission—from a first room of the home to a second room consists in switching on the decoder of the second room and recording thereon the transmission underway, when the decoders propose a so-called "multi-room" solution.

When the audio-visual transmission exists on the cloud, that is to say that it has been recorded in NPVR (Network Personal Video Recorder) format, then the user does not need to record the audio-visual transmission beforehand; he can simply rerun it manually in order to resume the audio-visual transmission at the spot where it was when he left the first room.

A method and a system, described in the document US 2010017474 A1, enable a rerun of an audio-visual transmission viewed by several users. However, this system and this method require a manual intervention by users. They do not allow an automatic rerun of the transmission.

The document US 20090216351 A1 describes a system and a method making it possible to extend the capabilities of a UPnP AV network architecture with a "follow-me" functionality providing to users the possibility of pausing or stopping the reading of the audio-visual transmission at one location in the UPnP AV network then resuming the reading of this transmission later. However, this system and this method require manual interventions by the users.

SUMMARY

To respond to the aforementioned problem of following an audio-visual transmission through the rooms of a home, the Applicant proposes an automatic method for following an audio-visual transmission in which a temporisation of the audio-visual transmission is launched as soon as a movement of a connected device associated with the user is detected.

According to a first aspect, the invention relates to a method for following an audio-visual transmission between at least a first and a second items of broadcasting equipment connected through a router and each able to broadcast at least partially the audio-visual transmission, wherein each of the items of broadcasting equipment comprises a calculation processor, a memory and at least one interface for following a connected device associated with a user and wherein the method comprises the following operations:

detection, by the first broadcasting equipment, of the moving away of the connected device with respect to the first broadcasting equipment,
  sending, by the first broadcasting equipment, of a moving away message destined for all of the items of broadcasting equipment connected to the router, this moving away message comprising data for temporisation of the audio-visual transmission,
  verification, by each of the items of broadcasting equipment connected to the router, of the approach of the connected device,
  detection, by the second broadcasting equipment, of the approach of the connected device associated with the user,
  broadcasting of the audio-visual transmission, by the second broadcasting equipment, as a function of the temporisation data transmitted by the first broadcasting equipment in the moving away message, and
  transmission, by the second broadcasting equipment, of an acknowledgement message destined for all of the items of broadcasting equipment.

The method of an aspect of the invention allows a user to continue, in an automatic manner, to view and/or to listen to an audio-visual transmission on the different items of broadcasting equipment of a premises.

Beneficially, the method comprises a preliminary operation of recognising the connected device associated with the user and of transmission, to the items of broadcasting equipment connected to the router, of a following message containing data for following the connected device.

Apart from the aforementioned characteristics, the method according to the invention may have one or more complementary characteristics among the following, considered individually or according to all technically possible combinations thereof:

each following message comprises, in a message frame, a MAC address relative to the connected device, a close threshold value, a distant threshold value and a user identifier.

each moving away message comprises, in a message frame, an identifier of the broadcasting equipment transmitting the moving away message, the MAC address of the connected device, an information for relaunching the audio-visual transmission and the temporisation data.

the preliminary operation of recognising the connected device comprises at least one measurement, at least by the first broadcasting equipment, of a received signal strength indicator.

the preliminary operation of recognising the connected device comprises a sampling of the received signal strength indicator.

the preliminary operation of recognising the connected device comprises a selection of the connected device, by the user.

the method comprises, after reception of the acknowledgement message, and in the absence of a second connected device detected near to the first broadcasting equipment, an operation of stopping the broadcasting by the first broadcasting equipment.

the connected device communicates with the items of broadcasting equipment via a Bluetooth wireless exchange protocol.

when the connected device is detected on approaching the second broadcasting equipment, the second broadcasting equipment sends to the user a request for acceptance to resume the audio-visual transmission.

According to a second aspect, the invention relates to an equipment for broadcasting an audio-visual transmission, wherein the equipment comprises a calculation processor, a memory and at least one interface for following a connected device associated with a user, the broadcasting equipment being able to detect a moving away and an approach of the connected device, to send, receive and process a moving away message, and to broadcast the audio-visual transmission while taking into account a temporisation data contained in the moving away message.

According to a third aspect, the invention relates to a system for broadcasting an audio-visual transmission implementing the method such as defined above and comprising:
at least a first and a second items of broadcasting equipment connected through a router, and
at least one connected device, associated with a user and connected to the items of broadcasting equipment by a wireless exchange protocol, each of the first and second items of broadcasting equipment comprising a calculation processor, a memory and at least one interface for following the connected device.

This system has the benefit of not requiring any supplementary device, more or less costly. This system is constituted uniquely of items of equipment (items of broadcasting equipment, connected device, router) present in a conventional home which, in the invention, have the particularity of exchanging information between each other.

According to a fourth aspect, the invention relates to a computer programme, which includes instructions which, when they are executed by an equipment for broadcasting an audio-visual transmission, are capable of implementing the method such as defined above for detecting the connected device and broadcasting the audio-visual transmission.

According to a fifth aspect, the invention relates to a non-transitory storage or computer readable medium, which stores a computer programme including instructions to implement, by an equipment for broadcasting an audio-visual transmission, the method such as defined above when the programme is executed by a processor of the equipment.

BRIEF DESCRIPTION OF THE FIGURES

Other benefits and characteristics of the invention will become clear on reading the description, illustrated by the figures in which.

DETAILED DESCRIPTION

An exemplary embodiment of an automatic method for following an audio-visual transmission and the system implementing this method is described in detail hereafter, with reference to the appended drawings. This example illustrates the characteristics and benefits of the invention. It is however recalled that the invention is not limited to this example.

In the figures, identical elements are marked by identical references. For questions of legibility of the figures, the size scales between represented elements are not respected.

Figure 1:
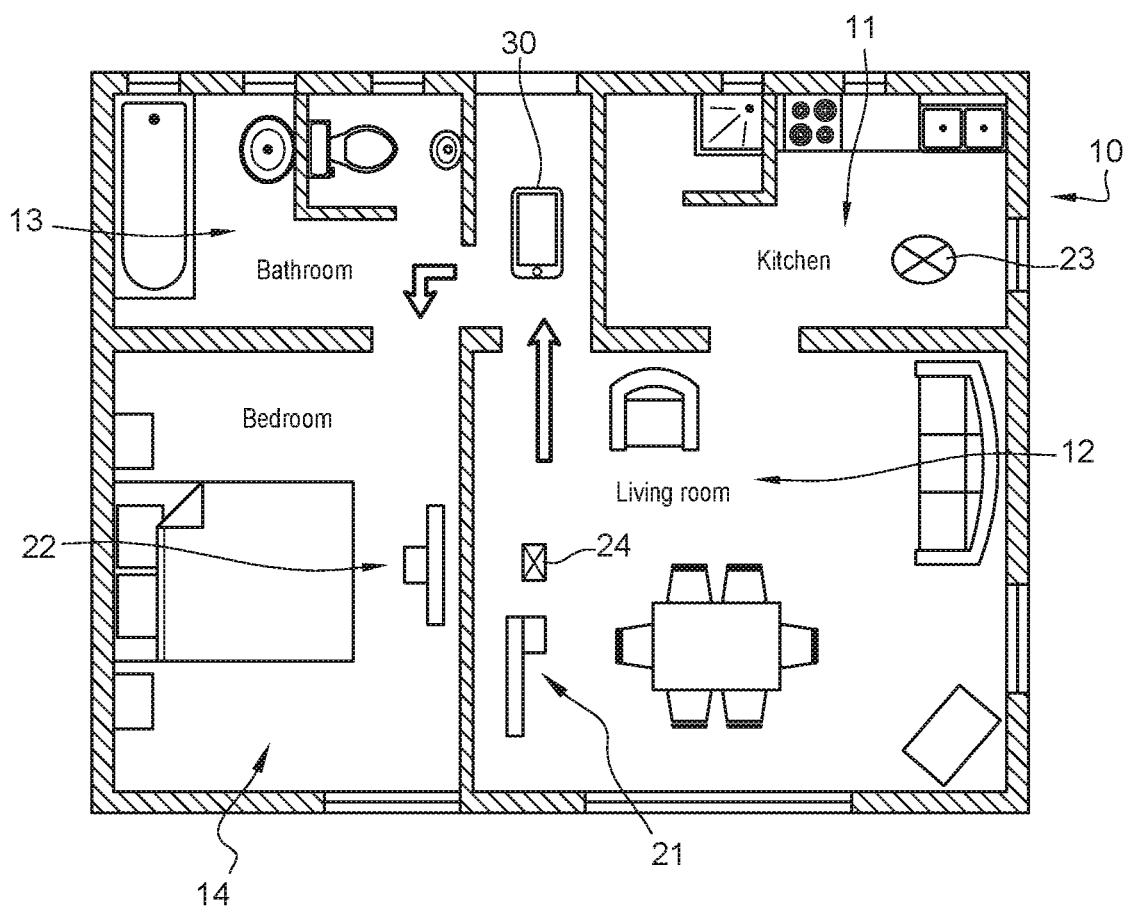
FIG. 1 schematically represents an example of a plan of an apartment in which items of broadcasting equipment are installed in different rooms.

FIG. 1 represents an example of a plan of an apartment in which three items of broadcasting equipment are installed in three different rooms. Those skilled in the art will understand that the method and the items of equipment that will be described hereafter may be implemented in all sorts of homes or premises, whether individual homes, collective homes, commercial premises, etc. In the example of FIG. 1, the apartment 10 comprises a kitchen 11, a living room 12, a bathroom 13 and a bedroom 14. In this apartment 10, a first broadcasting equipment 21 is installed in the living room 12 and a second broadcasting equipment 22 is installed in the bedroom 14, these first and second items of broadcasting equipment each being, for example, a decoder/television set. A third broadcasting equipment 23 is installed in the kitchen 11, this third broadcasting equipment 23 being, for example, a smart speaker. Indeed, according to an embodiment of the invention, a broadcasting equipment may be any type of device or set of devices making it possible to broadcast entirely or partially an audio-visual transmission. In other words, a broadcasting equipment may be a device or a set of devices making it possible to broadcast the sound and the image of an audio-visual transmission, or instead only the sound, or instead only the image. The broadcasting equipment may thus be, for example, a decoder/television set, a smart speaker, a mobile telephone, or any other electronic device capable of broadcasting a visual transmission and/or an audio transmission.

In the example of apartment of FIG. 1, each item of broadcasting equipment 21, 22, 23 is independent of the or other items of broadcasting equipment of the home or premises, which offers each item of equipment the possibility of displaying a specific audio-visual transmission, different from the audio-visual transmissions displayed on the other items of equipment. However, each item of broadcasting equipment (called more simply equipment) is connected to the other items of equipment through a router ensuring the routing of packets in the computer network of the home. This router may be, for example, the Wi-Fi router of the home. In the example of FIG. 1, the router 24 is located in the living room 12, it being understood that it may be positioned in any location of the home and that it may be independent or integrated in a computer device of the home.

All of the items of broadcasting equipment 21, 22, 23 of the home form, with the router 24, the broadcasting system of an embodiment of the invention. This broadcasting system comprises, moreover, at least one connected device 30 associated with a user. Indeed, nowadays, the majority of persons keep on them, or within reach, a connected device such as a smart watch or a mobile telephone. The system of the invention proposes detecting the movements, in the home, of certain at least of the connected devices and to consider that each connected device is moved with its user. By following the movement of the connected device, the broadcasting system follows the movement of the user and enables an automatic continuation of the broadcasting of the audio-visual transmission on the different items of equipment of the system, such that the user does not miss a part of the audio-visual transmission.

Figure 2:
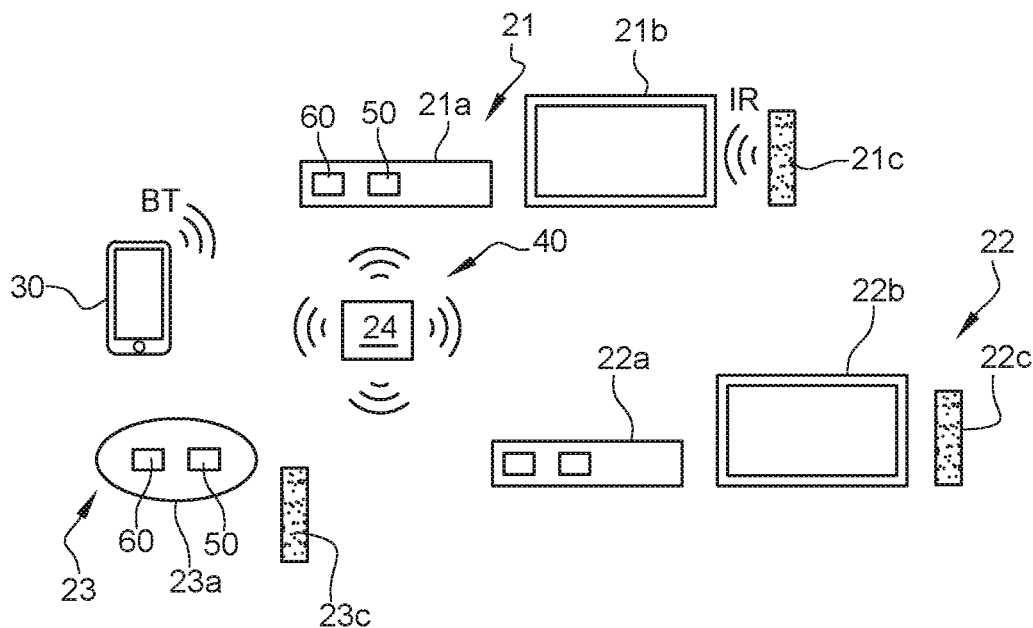
FIG. 2 represents a schematic view of an example of system for automatically broadcasting an audio-visual transmission according to an embodiment of the invention.

FIG. 2 represents an example of broadcasting system according to the invention. This example corresponds to the broadcasting system installed in the apartment 10 of FIG. 1. In this example, the broadcasting system thus comprises a first decoder/television set 21 forming the first equipment of the system, a second decoder/television set 22 forming the second equipment and a smart speaker 23 forming the third equipment of the broadcasting system. Each decoder/television set 21, 22 may comprise a decoder 21a, 22a, a television 21b, 22b and a remote control 21c, 22c, the decoder being equipped with an audio-video output interface, for example of HDMI type, connected to the television.

Each item of equipment 21, 22, 23 comprises several digital signal inputs, such as for example Ethernet, Cable, Satellite, TNT antenna and Wi-Fi inputs. Each item of equipment 21, 22, 23 also comprises a calculation processor and a memory to implement the method of the invention. The calculation processor includes one or more electronic circuits to perform its function(s). The memory may be a non-transitory machine readable medium encoded with instructions for implementing the steps of the invention. Each item of equipment further comprises a first interface 50, for example a Bluetooth interface (e.g. an interface that implements the IEEE 802.15.1 protocols), to implement the following of the connected device and, in certain alternatives, to manage user actions via the remote control. In certain other alternatives, each item of equipment 21, 22, 23 may also comprise a second interface 60, for example infra-red (IR), to manage user actions, for example via the remote control 21c, 22c, 23c. The interface comprises one or more electronic circuits to perform its functions.

The broadcasting system of FIG. 2 further comprises a router 24 connected by any known communication means to the different items of broadcasting equipment 21, 22, 23 of the system. In the example of FIG. 2, the router 24 communicates with the items of broadcasting equipment by Wi-Fi (shown schematically by the reference 40). This router 24 enables all of the items of equipment to communicate with each other and to share events and audio/video data streams.

The broadcasting system of FIG. 2 also comprises at least one connected device 30, associated with a user, and communicating with the items of broadcasting equipment by a communication protocol such as Bluetooth (shown schematically by the reference BT in FIG. 2). The system may comprise as many connected devices as users of the system, each connected device needing to have been selected beforehand by the user and recognised by the broadcasting system, in the manner described hereafter. The connected device may be a mobile telephone, a smartwatch or any other connected device associated specifically with a user.

This broadcasting system enables a user equipped with his connected device to continue to view and/or listen to an audio-visual transmission when he moves about in his home. For example, when the user, who is watching an audio-visual transmission on a first broadcasting equipment, for example the decoder/television set 21 of the living room 12, moves away, equipped with his connected device 30, from the first equipment and goes out of the living room, the broadcasting equipment 21 detects his moving away. It then informs the other items of equipment 22, 23 of the home 10 that the user has moved away and that he is certainly going to come closer to another broadcasting equipment of the home. Each item of equipment 21, 22, 23 of the home then verifies if the user, equipped with his connected device 30, is coming closer to the equipment. If the user is detected, via his connected device, as approaching the second broadcasting equipment, then the second equipment starts up the broadcasting of the audio-visual transmission. In the example of FIG. 1, if the connected device 30 is detected as approaching the equipment 22, then the decoder/television set 22 begins the audio-visual broadcasting of the audio-visual transmission at the place where the audio-visual transmission was when the user moved away from the decoder/television set 21 of the living room. If the connected device 30 is detected as approaching the equipment 23 of the kitchen, then the smart speaker 23 begins the audio broadcasting of the audio-visual transmission at the place where the audio-visual transmission was when the user moved away from the decoder/television set 21 of the living room.

Figure 3:
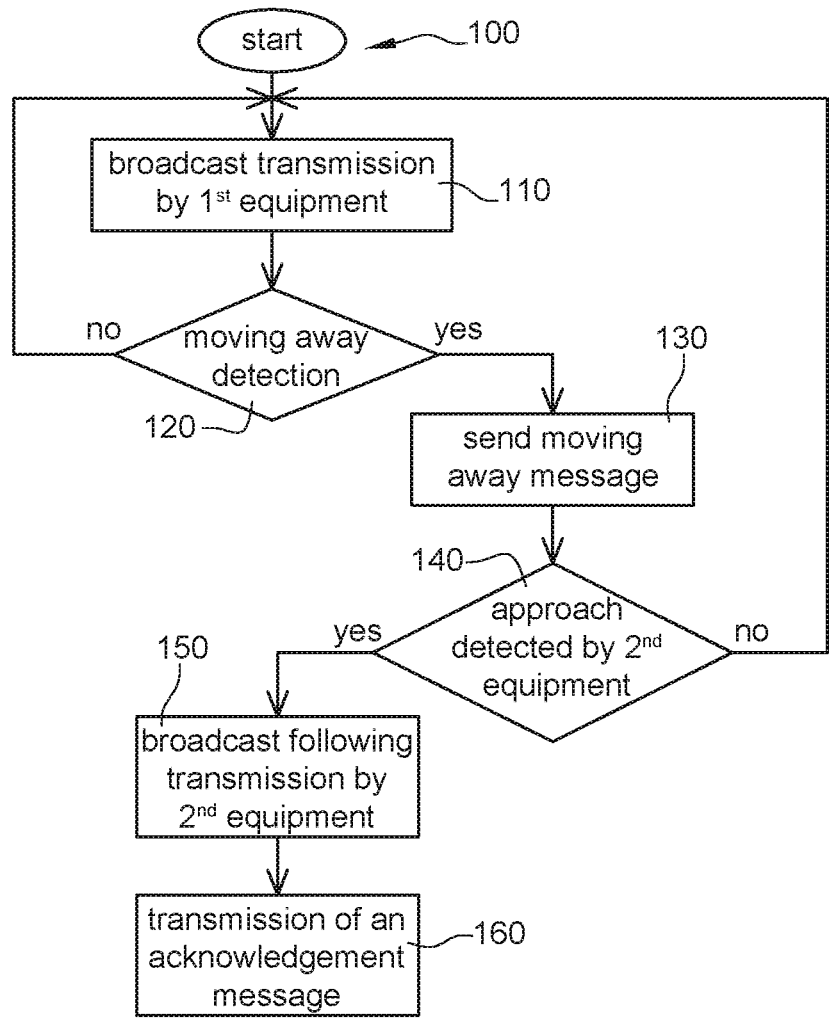
FIG. 3 represents an example of functional diagram of the method according to certain embodiments of the invention.

An example of a method according to the invention is represented in the form of a functional diagram in FIG. 3. This method 100 comprises, during a step 110, the broadcasting of an audio-visual transmission by a first equipment. It also comprises a step 120 of detection of the moving away of the connected device with respect to the first equipment. This step 120 consists in the first equipment determining if the signal that it receives from the connected device is greater or lesser than a threshold value, called proximity threshold. Indeed, if the signal that the first equipment receives is less than this proximity threshold, this signifies that the connected device is moving away from the first equipment. If this is not the case—that is to say that the connected device is detected near to the first equipment—then the broadcasting of the transmission by the first equipment continues. If this is the case—which signifies that the connected device is detected as moving away from the first equipment—then the first equipment sends, via the router, a moving away message to all of the items of equipment of the broadcasting system (step 130). The items of equipment then verify if the connected device is approaching one of them. When, at step 140, the connected device is detected close to one of the items of equipment, here called second equipment, then the second equipment starts the broadcasting of the remainder of the audio-visual transmission (step 150). If no equipment detects the approach of the connected device, then the audio-visual transmission continues to be broadcast on the first equipment. When the second equipment has started the broadcasting of the audio-visual transmission (step 150), then the second equipment transmits an acknowledgement message (160) destined for all of the items of equipment of the broadcasting system. This acknowledgement message may, for example, contain the identifier of the second broadcasting equipment as well as the user identifier and be transmitted by means of an exchange protocol similar to the protocol described hereafter for sending the moving away message. According to the embodiments and the parameterisation of the broadcasting system, the broadcasting by the first equipment may be interrupted automatically, unless the presence of another connected device has been detected near to the first equipment. Indeed, the method of an embodiment of the invention can provide to switch off automatically an item of broadcasting equipment, when the broadcasting has been resumed by another item of equipment. It may also provide to ask the user, via an acknowledgement message, if the broadcasting on the first equipment has to be interrupted. In an alternative, the method of an embodiment of the invention may provide to switch off the first broadcasting equipment, when the broadcasting has been resumed by the second equipment and only if no other connected device is detected near to the first equipment. These different embodiments and alternatives may be parameterised, as described later.

The method 100 may comprise, before step 110, a preliminary operation of recognising the connected device. This recognition operation firstly comprises a selection of the connected device by the user. Indeed, during the installation of the broadcasting system, each connected device of the users of the system is detected beforehand at least by the first equipment. Each user then selects, from a menu displayed on the first equipment, the connected device with which he is associated.

Once the connected device has been selected, proximity and/or moving away information are identified. To do so, several technologies may be used such as, for example, NFC (Near Field Communication) technology, Beacon technology, Wi-Fi positioning, and Bluetooth technology, etc. In the present description, the identification of proximity and/or moving away information is carried out by means of Bluetooth technology. Certain technologies enable precise localisation of the connected device. Although Bluetooth technology is easy to implement, it does not however enable very precise localisation of the connected device. The preliminary recognition operation may then comprise a learning phase, during which at least the first equipment is going to learn the close threshold and distant threshold values of the connected device.

In the example where the first equipment is a decoder/television set, a menu displayed on the television makes it possible to display the list of connected devices provided to enable the identification of the user. The user is invited to install himself in front of his screen and to select the connected device that he wishes to use to make it possible to implement the following method, for example a smart phone of which the Bluetooth is activated. After this selection, the decoder measures the strength of the Bluetooth signal that it receives from the smart phone and memorises this connected device and this strength as reference for the user.

The measurement of the received signal strength, in Bluetooth technology, uses the RSSI (Received Signal Strength Indicator) value, sampled over a short time lapse of several seconds (for example 5 seconds) which makes it possible to filter the noise inherent in the reception of a radio signal. The signal on the selected connected device is measured during this time lapse and memorised as threshold value.

A close threshold value is measured, for example when the user is installed in front of his television. A distant threshold value is measured when, on invitation of the configuration system, the user moves away from the television during a period of several seconds (for example 10 seconds). A final movement of the user near to the television makes it possible to finalise the identification. The measurement of the signal is then recorded and becomes the reference for the event for activating the following of the audio-visual transmission on the various items of equipment of the broadcasting system.

Each new user wishing to be registered will have to identify his connected device in the manner described above.

Those skilled in the art will understand that the RSSI value is a value mainly linked to the drivers of the Bluetooth chip and is not standardised. The learning phase makes it possible to detect the threshold values specific to each connected device. The use of the SNR (Signal to Noise Ratio) is another possible technique to measure the received signal strength of the connected device, if this value is available via the Bluetooth chip.

Once the connected device has been selected and its threshold values measured, these data are transmitted to all of the items of equipment of the broadcasting system by sending a following message. This following message, which comprises the data required to follow the connected device through the home, is transmitted by the first equipment to all of the items of equipment of the broadcasting system in order that each of these items of equipment can detect the connected device on approach.

Figure 4:
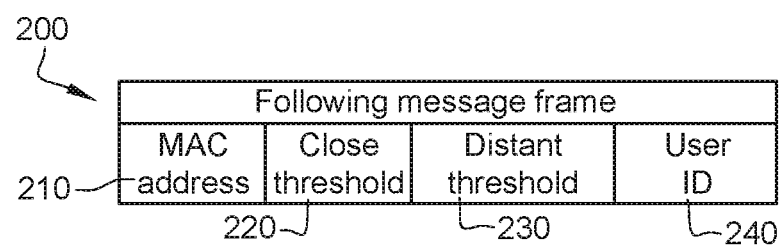
FIG. 4 and FIG. 5 represent examples of frames, respectively, of a following message and of a moving away message.

An example of following message is represented schematically in FIG. 4. This following message 200 comprises, within a same message frame, the MAC address 210 of the connected device, its close threshold value 220 such as measured, its distant threshold value 230 such as measured and a user identifier. The user identifier allows each user to easily find his connected device in the list, during the selection. The MAC address has the benefit of being an address specific to each connected device, which makes it possible to associate, with each connected device, its own close and distant threshold values.

In an alternative, the close and distant threshold values are measured for a single connected device and these values are attributed by default to each new connected device. This alternative, although less precise, enables a rapid installation of new connected devices.

In another alternative, it is sought, conversely, to refine the detection of proximity and moving away of the connected devices. To do so, the learning phase such as defined above is implemented by each item of broadcasting equipment, which makes it possible to obtain a precise detection, suited to the size of each room of the home.

Figure 5:
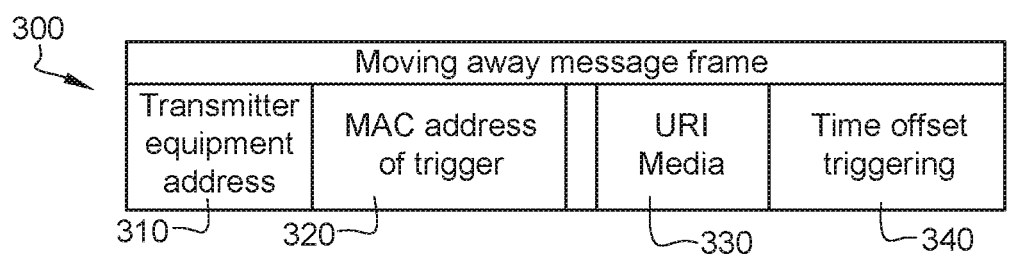

As soon as the recognition operation has ended, the broadcasting system is operational and any user can follow automatically an audio-visual transmission from one room to the other of the home. The following of the connected device through the home is achieved, as explained previously, by detecting the moving away and/or the proximity of the connected device. More precisely, when the connected device moves away from a broadcasting equipment, the equipment transmits a moving away message destined for the other items of broadcasting equipment so that they verify if the connected device is approaching one of them. An example of a moving away message is represented in FIG. 5. This moving away message 300 includes, in a same message frame, an identifier 310 of the broadcasting equipment transmitting the moving away message, the MAC address 320 of the connected device, an information 330 to resume the audio-visual transmission and a temporisation data 340. The identifier 310 of the broadcasting equipment is an identifier of the equipment having transmitted the moving away information. It may be used, notably, to display on the second equipment that the content of the audio-visual transmission is that which was broadcast by the first equipment. The MAC address 320 of the connected device makes it possible to attach to the connected device the user identifier that has generated the event. The information to resume the audio-visual transmission 330, designated "URI Media" (Uniform Resource Identifier Media) in FIG. 5, is the information making it possible to resume the reading of the content of the audio-visual transmission, for example a HLS M3U8 link, which allows the second equipment to know from which source comes the content of the audio-visual transmission, for example a Multicast, HLS, Netflix, TNT, SAT source, etc. The temporisation data 340, named "Time Offset triggering" in FIG. 5, is the time shift information making it possible to return, in the content of the audio-visual transmission, to the moment where the moving away of the connected device has been detected such that the user does not lose the content of the audio-visual transmission.

The moving away message may be sent by the equipment having detected the moving away of the connected device, by any type of standard network protocol such as, for example, by WebSocket, UPnP or any other network protocol known to those skilled in the art.

Thus, in the example of the apartment of FIG. 1, if the user, who is watching an audio-visual transmission in his living room, moves in order to go into the kitchen, then the content of the audio-visual transmission broadcast on the television 21 of the living room continues until the user enters the kitchen. At this instant, the smart speaker 23 of the kitchen broadcasts the sound of the audio-visual transmission. When the user comes back into his living room, the sound stops in the kitchen. If, still in the example of the apartment of FIG. 1, the user moves from his living room, to his bedroom, the decoder/television set 22 of the bedroom detects the approach of the user and broadcasts the audio-visual transmission from the moment where the moving away event had been transmitted.

In certain embodiments, the method of the invention may comprise an operation of parameterisation of certain variables. Indeed, the menu displayed on the broadcasting equipment during the installation of the broadcasting system may propose to parameterise certain variables such as, for example, a time slot during which the automatic following of the audio-visual transmission is allowed. It can also propose to select the items of equipment allowed to implement the automatic following of the audio-visual transmissions and to define the management of these items of equipment, notably the turning on and turning off of the items of equipment. It can also propose, systematically or in certain time slots, to request the agreement of the user for following an audio-visual transmission. It may also propose to define a hierarchy of the connected devices of the users, the connected devices of the parents being able, for example, to be given priority over those of the children. It may further propose defining the conditions for turning off and/or turning on broadcasting equipment. Those skilled in the art will understand that these propositions for parameterisations are only examples and that other parameterisations may be envisaged as a function, notably, of the considered premises, the users, the items of broadcasting equipment, etc.

In other embodiments, the following of the audio-visual transmission may be carried out by means of the connected device of the user, for example when the connected device is a smart phone or a tablet. Indeed, if in the embodiments described previously the connected device only has a role of trigger (by the detection of its moving away), it may also constitute one of the items of broadcasting equipment of the system. Indeed, a dedicated application may be downloaded onto the connected device to enable it to broadcast the audio-visual transmission. In these embodiments, the connected device serves at one and the same time for the detection of the moving away of the user, as described previously, and for the broadcasting of the audio-visual transmission, like any other item of equipment of the broadcasting system, which makes it possible to continue viewing an audio-visual transmission during the movement or when the user is out of range of a broadcasting equipment. In these embodiments, the information received by the connected device is the same as the frame sent by the equipment transmitting the moving away message, but will be processed by the application of the operator installed on the connected device that will alone be able to interpret it to broadcast the content.

Although described through a certain number of examples, alternatives and embodiments, the following method and the broadcasting system according to the invention include various alternatives, modifications and improvements which will become clear in an obvious manner to those skilled in the art, it being understood that these alternatives, modifications and improvements form part of the scope of the invention.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor, digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. A single processor or several other units may be used to implement the invention. The different characteristics described and/or claimed may be beneficially combined. Their presence in the description or in the different dependent claims do not exclude this possibility. The reference signs cannot be understood as limiting the scope of the invention.

The invention claimed is:

1. A method for following an audio-visual transmission between at least a first and a second items of broadcasting equipment connected through a router and each able to broadcast at least partially the audio-visual transmission, wherein each of the items of broadcasting equipment comprises a calculation processor, a memory and at least one interface for following a connected device associated with a user, the method comprising:

detecting, by the first item of broadcasting equipment, a moving away of the connected device with respect to said first item of broadcasting equipment, sending, by the first item of broadcasting equipment, of a moving away message destined for all of the items of broadcasting equipment connected to the router, the moving away message comprising, in a message frame, an identifier of the first item of broadcasting equipment transmitting the moving away message, a MAC address of the connected device, an information to resume the audio-visual transmission and data for temporisation of the audio-visual transmission, verifying, by each of the items of broadcasting equipment connected to the router, of the approach of the connected device, detecting, by the second item of broadcasting equipment, of the approach of the connected device associated with the user, broadcasting the audio-visual transmission, by the second item of broadcasting equipment, as a function of the temporisation data transmitted by the first item of broadcasting equipment in the moving away message, and transmitting, by the second item of broadcasting equipment, of an acknowledgement message destined for all of the items of broadcasting equipment.

2. The method according to claim 1, further comprising a preliminary operation of recognising the connected device associated with the user and transmission, to the items of broadcasting equipment connected to the router, of a following message containing data for following said connected device.

3. The method according to claim 2, wherein each following message comprises, in a message frame, a MAC address relative to the connected device, a close threshold value, a distant threshold value and a user identifier.

4. The method according to claim 2, wherein the preliminary operation of recognising the connected device comprises at least one measurement, at least by the first item of broadcasting equipment, of a received signal strength indicator.

5. The method according to claim 4, wherein the preliminary operation of recognising the connected device comprises a sampling of the received signal strength indicator.

6. The method according to claim 2, wherein the preliminary operation of recognising the connected device comprises a selection of the connected device, by the user.

7. The method according to claim 1, further comprising, after reception of the acknowledgement message, and in the absence of a second connected device detected near to the first item of broadcasting equipment, an operation of stopping the broadcasting by the first item of broadcasting equipment.

8. The method according to claim 1, wherein the connected device communicates with the items of broadcasting equipment via a Bluetooth wireless exchange protocol.

9. The method according to claim 1, wherein, when the connected device is detected on approaching the second item of broadcasting equipment, said second item of broadcasting equipment sends to the user a request to accept a resumption of the audio-visual transmission.

10. An equipment for broadcasting an audio-visual transmission, comprising a calculation processor, a memory and at least one interface for following a connected device associated with a user, said broadcasting equipment being adapted:
- to detect a moving away and an approach of the connected device,
- to send, receive and process a moving away message comprising, in a message frame, an identifier of the broadcasting equipment transmitting the moving away message, a MAC address of the connected device, an information to resume the audio-visual transmission and temporisation data, said moving away message being destined to all items of broadcasting equipment connected to a router to which said broadcasting equipment is connected, and
- to broadcast the audio-visual transmission taking account of temporisation data contained in the moving away message.

11. A system for broadcasting an audio-visual transmission implementing the method according to claim 1, comprising:
- at least a first and a second items of broadcasting equipment connected through a router, and
- at least one connected device, associated with a user and connected to the items of broadcasting equipment by a wireless exchange protocol,
- each of the first and second items of broadcasting equipment comprising a calculation processor, a memory and at least one interface for following the connected device.

12. A non-transitory machinereadable medium, including machine readable instructions for implementing, by an equipment for broadcasting an audio-visual transmission, the method according to claim 1 when the machine readable instructions are executed by a processor of said equipment.

* * * * *